United States Patent [19]

Faler et al.

[11] Patent Number: 5,084,506
[45] Date of Patent: Jan. 28, 1992

[54] STABLE NONAQUEOUS MICROPARTICLE DISPERSIONS PREPARED FROM AMINOPLAST RESINS

[75] Inventors: Dennis L. Faler, Glenshaw; Gregory J. McCollum, Gibsonia; James B. O'Dwyer, Valencia; Marvis E. Hartman, Pittsburgh, all of Pa.

[73] Assignee: PPG Industries, Inc., Pittsburgh, Pa.

[21] Appl. No.: 128,315

[22] Filed: Dec. 3, 1987

[51] Int. Cl.$^5$ .............................................. C08L 61/22
[52] U.S. Cl. .................................... 524/597; 524/850; 524/853; 524/923; 525/443; 525/456; 525/517; 525/519
[58] Field of Search ............... 524/509, 513, 597, 923, 524/589, 853; 525/443, 456, 517, 519

[56] References Cited

U.S. PATENT DOCUMENTS

| | | | |
|---|---|---|---|
| 3,485,802 | 12/1969 | Witsiepe | 260/77.5 |
| 3,525,717 | 8/1970 | Butler et al. | 260/75 |
| 3,655,627 | 4/1972 | Hutzler et al. | 260/77.5 AA |
| 3,748,294 | 7/1973 | Kershaw et al. | 260/22 TN |
| 3,812,075 | 5/1974 | Burdett et al. | 260/33.60 A |
| 3,817,886 | 6/1974 | McGarr | 260/18 TN |
| 3,872,049 | 3/1975 | Farah et al. | 260/33.6 UB |
| 3,917,741 | 11/1975 | McGarr | 260/859 R |
| 3,925,295 | 12/1975 | Osborn et al. | 260/34.2 |
| 3,935,155 | 1/1976 | Osmond et al. | 260/34.2 |
| 3,981,839 | 9/1976 | Asher et al. | 260/33.6 R |
| 3,985,700 | 10/1976 | Nicks et al. | 260/33.6 R |
| 4,059,557 | 11/1977 | Bentley et al. | 260/31.2 N |
| 4,083,831 | 4/1978 | Santosusso | 260/77.5 AA |
| 4,102,846 | 7/1978 | Bentley et al. | 260/31.2 N |
| 4,107,256 | 8/1978 | Conrad et al. | 264/310 |
| 4,138,376 | 2/1979 | Nicks | 260/22 TN |
| 4,206,099 | 6/1980 | Bentley et al. | 260/22 CB |
| 4,229,339 | 10/1980 | Bentley et al. | 260/34.2 |
| 4,232,135 | 11/1980 | Bentley et al. | 525/509 |
| 4,260,530 | 4/1981 | Reischl et al. | 525/456 |
| 4,294,735 | 10/1981 | Bentley et al. | 260/22 CB |
| 4,301,262 | 11/1981 | Wagner et al. | 525/456 |
| 4,533,254 | 8/1985 | Cook et al. | 366/176 |
| 4,569,966 | 2/1986 | Piccirilli et al. | 524/589 |
| 4,644,033 | 2/1987 | Gnanou et al. | 524/590 |
| 4,705,839 | 11/1987 | Martin | 528/49 |

FOREIGN PATENT DOCUMENTS

| | | |
|---|---|---|
| 0238166 | 9/1987 | European Pat. Off. |
| 956453 | 10/1965 | United Kingdom |
| 1007476 | 10/1965 | United Kingdom |
| 1408945 | 10/1975 | United Kingdom |
| 1432112 | 4/1976 | United Kingdom |
| 1428907 | 3/1977 | United Kingdom |

OTHER PUBLICATIONS

"Power for the Competitive Edge", *Microfluidizer Processing Equipment*, Microfluidics Corporation, Newton, MA (1986).

Dowbenko and Hart, "Nonaqueous Dispersions as Vehicles for Polymer Coatings", *I & EC Product Research & Development*, vol. 12 (1973), pp. 14–28.

*Primary Examiner*—Joseph L. Schofer
*Assistant Examiner*—Mark D. Sweet
*Attorney, Agent, or Firm*—Linda Pingitore

[57] ABSTRACT

A stable, nonaqueous microparticle dispersion of the polymeric reaction product of reactants containing an aminoplast resin and a hydroxyl containing material is characterized in that less than 20 percent of the polymer microparticles have a mean diameter greater than 5 microns, further characterized in that at a total solids content of 60 percent the Brookfield viscosity is less that 1000 centipoise measured at 50 RPM using a number 3 spindle at 25° C., the polymeric reaction product being prepared from reactants which are substantially free of acrylic polymer in a nonaqueous medium which is inert to the reactants.

Stable nonaqueous microparticle dispersions characterized as above can also be prepared by the self condensation of an aminoplast resin.

14 Claims, No Drawings

STABLE NONAQUEOUS MICROPARTICLE DISPERSIONS PREPARED FROM AMINOPLAST RESINS

CROSS REFERENCE TO RELATED APPLICATIONS

This application is related to Serial No. 128,316, entitled "Method For Preparing Stably Dispersed Nonaqueous Microparticle Dispersion" now U.S. Pat. No. 4,833,177 and Serial No. 128,353, entitled "Stable Nonaqueous Polyurethane Microparticle Dispersion", now U.S. Pat. No. 4,783,502 both filed even date herewith.

BACKGROUND OF THE INVENTION

The present invention relates to nonaqueous, microparticle dispersions.

Nonaqueous microparticle dispersions have been known in the art for some time. However, the known nonaqueous microparticle dispersions are not without attendant difficulties. The inability to prepare dispersions so that they are uniformly of a small particle size, that is, a predominant number of the particles have a mean diameter on the order of less than five microns, preferably less than one micron has been a major problem. In addition, generally because of the large particle size, nonaqueous microparticle dispersions have suffered from the lack of stability especially when the continuous phase is of low viscosity. This typically means that the dispersion either settles upon standing or coagulates and forms large clumps. Moreover, the known nonaqueous microparticle dispersions have been typically of low solids content. Therefore their use in coating applications has led to increased volatile organic content of the resultant coating compositions. Efforts to prepare the dispersions at higher solids levels has generally resulted in unmanageably high viscosities. In addition, certain chemical compositions are difficult to prepare as nonaqueous dispersions by known techniques. In particular, aminoplast polyol condensates where the polyol component is essentially free of acrylic polymer are not available as stable, small particle size nonaqueous dispersions.

There is a need, therefore, for new stable nonaqueous microparticle dispersions having a uniformly small particle size and which are free of the difficulties attendant upon currently available materials.

SUMMARY OF THE INVENTION

In accordance with the present invention there is provided a stable nonaqueous microparticle dispersion of the self condensation polymaric product of reactants comprising an aminoplast resin which is characterized in that less than 20 percent of the polymer microparticles have a mean diameter greater than five microns, further characterized in that at a total solids content of 60 percent the Brookfield viscosity is less than 1000 centipoise measured at 50 RPM using a number 3 spindle at 25° C., the polymeric product being prepared from reactants which are substantially free of acrylic polymer. There is also provided a stable, nonaqueous microparticle dispersion of the polymeric reaction product of reactants comprising an aminoplast resin an-d a hydroxyl containing material. The nonaqueous dispersion is also characterized in that less than 20 percent of the polymer microparticles have a mean diameter greater than five microns, further characterized in that at a total solids content of 60 percent the Brookfield viscosity is less than 1000 centipoise measured at 50 RPM using a number 3 spindle at 25° C., the polymeric reaction product being prepared from reactants which are substantially free of acrylic polymer in a nonaqueous medium which is inert to the reactants.

DETAILED DESCRIPTION OF THE INVENTION

The preferred method for preparing the claimed microparticles which are stably dispersed in a nonaqueous medium involve as several steps. The first step of the preferred method involves mixing into a nonaqueous medium a polymerizable component. The polymerizable component comprises at least one polymerizable species preferably at least two polymerizable species and moreover at least 20 percent of the polymerizable component is insoluble in the nonaqueous medium. For the purposes of the present application, the term "insoluble" means that the insoluble component is observable as a separate phase.

The nonaqueous medium provides the continuous phase of the emulsion or dispersion in which the microparticles are suspended. The nonaqueous medium is one which is inert to the reactants and preferably is non-polar. A wide variety of organic solvents can be utilized. Preferably, a major amount of the nonaqueous medium is made up of an aliphatic solvent or mixture of aliphatic solvents. Examples of suitable nonaqueous media are hydrocarbons such as acyclic aliphatic hydrocarbons having from 4 to 30 carbon atoms and which are saturated such as N-pentane, N-hexane, N-heptane and N-octane; and cyclic hydrocarbons such cyclohexane and methyl cyclohexane. Also minor amounts of aromatic hydrocarbons such as xylene and toluene as well as other solvents including ketone solvents and ester solvents can be present. The preferred media are the acyclic aliphatic hydrocarbons. The liquid hydrocarbon may be a mixture of such materials and would include such commercially available products as mineral spirits and solvent naphtha.

If the polymerizable component is too viscous, for example a Brookfield viscosity greater than 20 poise measured at 50 RPM using a number 3 spindle at 25° C or a Z Gardner Holdt viscosity, then a polar solvent such as N-methyl-2-pyrrolidone, acetonitrile or ethanol can be used to dilute the polymerizable component. This is desirable from the standpoint that a less viscous polymerizable component requires less energy to particulate into small particles during the emulsification. However, the use of excessive amounts of polar solvents is not preferred because of the tendency of the polymerizable component to form a macrogel instead of discrete polymeric microparticles. It should be understood that the polar solvent can be inert to the reactants or it can be a reactive diluent such as for example, N-vinyl pyrrolidone.

One can prepare the claimed nonaqueous dispersions initially at low solids and then concentrate to high solids by distillation. In such an instance, a combination of a low boiling solvent (boiling point less than 100° C.) and high boiling solvent (boiling point greater than 150° C.) is preferred.

As was mentioned above, at least 20 percent of the polymerizable component is insoluble in the nonaqueous medium. Generally, fewer difficulties are encountered when the majority of the polymerizable component is insoluble in the nonaqueous medium. In one embodiment the nonaqueous microparticle dispersion can be prepared by self condensing one or more aminoplast resins. If desired water can also be added and it will react with the aminoplast during the polymerization.

The polymerizable species of the polymerizable component can be selected such that the resultant polymer can contain a variety of groups including ethylenically unsaturated free radically curable groups, hydroxyl groups, epoxy groups, carboxyl groups as well as unreacted aminoplast derived functionality. These groups can be pendant or terminal. For example, if one wishes to have unsaturated groups present one can utilize as a polymerzable species a hydroxyl functional vinyl monomer such as 2-hydroxyethyl acrylate or methacrylate or trimethylolpropane monoallyl ether.

Hydroxyl groups can be introduced by utilizing excess hdyroxyl containing material. Epoxy groups can be introduced by the addition of hydroxy functional epoxy compounds such as glycidol or certain polyglycidyl ethers of bisphenol A such as EPON 1001 available from Shell Chemical. Carboxyl groups can be introduced by reaction of a portion of the hydroxyl groups of the polyol with a cyclic anhydride either before, during or after the polymerization. Preferably the polymerizable component comprises as reactants an aminoplast resin and at least one hydroxyl containing material. The reactants can be monomeric materials, oligomers or polymers. At least one of the reactant species and preferably all, should be insoluble in the nonaqueous medium. Preferably the hydroxyl containing material is a polyol. Examples of polyol reactants include for example, polyester polyols, polyether polyols and polyurethane polyols. Each of these materials is discussed in detail below. Although a variety of materials are disclosed, fewer difficulties are encountered in the claimed method of preparation when the materials chosen are insoluble in the nonaqueous medium.

Examples of polyether polyols are polyalkylene ether polyols which include those having the following structural formula:

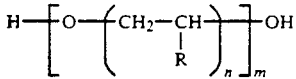

where the substituent R is hydrogen or lower alkyl containing from 1 to 5 carbon atoms including mixed substituents, and n is typically from 2 to 6 and m is from 2 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide, ethylene oxide and alkyl glycidyl ethers.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

In addition to the high molecular weight polyols mentioned above, mixtures of both high molecular weight and low molecular weight polyols can be used.

Among the low molecular weight polyols are diols, which are preferred, and triols such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol and cyclohexanedimethanol. Examples of triols include trimethylolpropane and trimethylolethane. Also useful are polyols containing ether linkages such as diethylene glycol and triethylene glycol.

Polyester polyols can be prepared by the polyesterification of an organic polycarboxylic acid or its functional equivalent (e.g., anhydride or ester) thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactone derived diols, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like. as well as higher molecular weight polyols such as those produced by oxyalkylating lower molecular weight polyols.

The acid component of the polyester consists primarily of monomeric carboxylic acids or anhydrides having 2 to 36 carbon atoms per molecule. Among the acids which are useful are phthalic acid, isophthalic acid, terephthalic acid, tetrahydrophthalic acid, decanedioic acid, dodecanedioic acid, and other dicarboxylic acids of varying types. The polyester may include minor amounts of monobasic acid such as benzoic acid, stearic acid, acetic acid, hydroxystearic acid and oleic acid. Also, there may be employed higher polycarboxylic acid such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol. The product of a lactone with an acid-containing polyol can also be used.

In addition to the aforedescribed polyols, polyurethane polyols can also be used. These polyols can be prepared by reacting any of the above-mentioned polyols with a minor amount of organic polyisocyanate (OH/NCO equivalent ratio greater than 1:1) so that terminal hydroxyl groups are present.

The organic polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis(cyclohexyl isocyanate) and isophorone diisocyanate. Useful aromatic diisocyanates include the various isomers of toluene diisocyanate, meta-xylene-diisocyanate, and para-xylene-diisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition the various isomers of alpha, alpha, alpha'-tetramethyl xylene diisocyanate can be used. Also useful as the polyisocyanate are isocyanurates such as DESMODUR 3300 from Mobay and biurets of isocyanates such as DESMODUR N100 from Mobay.

Aminoplast resins are based on the addition products of formaldehyde, with an amino- or amido-group carrying substance. Condensation products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanimines and alkyl- and aryl-substituted derivatives of such compounds, including alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino,1,3,5-triazine, 3,5-diaminotriazole, triaminopyrimidine, 2-mercapto-4,6-diamino-pyrimidine, 3,4,6-tris(ethylamino)-1,3,5-triazine, and the like.

While the aldehyde resins contain methylol or similar alkylol groups, and in most instances at least a portion of these alkylol groups are etherified by reaction with an alcohol as long as the alcohol chosen or the degree of etherification does not yield an aminoplast resin with excessive solubility in the solvent used in the nonaqueous medium. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as those sold under the trademarks CELLOSOLVE and CARBITOL, by Union Carbide and halogen-subsituted or other substituted alcohols, such as 3-chloropropanol and butoxyethanol. The preferred aminoplast resins are substantially alkylated with methanol.

The proportion of each of the materials which make up the polymerizable component can vary widely depending upon the polymeric structure desired. Typically the dispersion stabilizer or dispersant which is discussed below is used in an amount of from about 5 percent by weight to about 30 percent by weight, based on the total weight of the solid generating component of the pre-emulsification mixture. The balance is polymerizable component. For the purposes of determining these percentages the solid generating component does not include the inert materials which make up the nonaqueous medium as it has been defined herein. Reactive diluents as they have been defined herein, however, are considered to be solid generating.

Once the polymerizable component has been thoroughly mixed with the nonaqueous medium, the mixture is subjected to stress to particulate the mixture into microparticles which are uniformly of a fine particle size. The mixture is subjected to stress sufficient to result in a dispersion such that after polymerization less than 20 percent of the polymer microparticles have a mean diameter greater than 5 microns.

The preferred mode of subjecting the mixture of polymerizable component and nonaqueous medium to the appropriate stress is by use of a MICROFLUIDIZER ® emulsifier which is available from Microfluidics Corporation in Newton, Massachusetts. The MICROFLUIDIZER ® high pressure impingement emulsifier is patented in U.S. patent 4,533,254 which is incorporated herein by reference. The device consists of a high pressure (up to 20,000 psi) pump and an interaction chamber where the emulsification takes place. The pump forces the mixture of reactants in nonaqueous medium into the chamber where it is split into at least two streams which pass at a very high velocity through at least two slits and collide, resulting in the particulation of the mixture into small particles. Generally, the reaction mixture is passed through the emulsifier once at a pressure between 5,000 and 15,000 psi. Multiple passes result in smaller average particle size and a narrower range for the particle size distribution. When using the aforesaid MICROFLUIDIZER ® emulsifier, stress is applied by liquid liquid impingement as has been described. However, it should be understood that if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Stress is defined as force per unit area. Although the precise mechanism by which the MICROFLUIDIZER ® emulsifier stresses the pre-emulsification mixture to particulate it is unknown, it is theorized that stress is exerted in more than one manner. It is believed that one manner in which stress is exerted is by shear. Shear means that the force is such that one layer or plane moves parallel to an adjacent, parallel plane. Stress can also be exerted from all sides as a bulk, compression stress. In this instance, stress could be exerted without any shear. A further manner of producing intense stress is by cavitation. Cavitation occurs when the pressure within a liquid is reduced enough to cause vaporization. The formation and collapse of the vapor bubbles occurs violently over short time periods and produces intense stress. Although not intending to be bound by any theory, it is believed that both shear and cavitation contribute to producing the stress which particulates the pre-emulsification mixture.

Once the mixture has been particulated into microparticles, the polymerizable component within each particle is now polymerized under conditions sufficient to produce polymer microparticles which are stably dispersed in the nonaqueous medium. It should be understood that one of the requisite conditions sufficient to achieve the stably dispersed microparticle is the presence in the reaction mixture of a dispersion stabilizer also termed a dispersant. The dispersion stabilizer is preferably present when the polymerizable component is mixed into the nonaqueous medium prior to particulation. Alternatively, the dispersant can be introduced into the medium at a point just after the particulation within the MICROFLUIDIZER ® emulsifier. The dispersant, however, is an important part of the polymerizable component necessary to achieve the requisite particle stability. The stabilizer is a material whose role is to prevent the emulsified particles from agglomerating to form larger particles.

The same variety of dispersion stabilizers or dispersants which can be utilized during conventional nonaqueous emulsion polymerization are also suitable for this high stress technique. For a detailed listing of several suitable stabilizers see Dowbenko and Hart, "Nonaqueous Dispersions as Vehicles for Polymer Coatings", I&EC Product Research and Development, Vol. 12, March 1973, pages 14 to 20, copyright 1973. A preferred dispersion stabilizer is known as the comb stabilizer. Preparation of the comb type graft dispersant involves the polyesterification of preferably 12-hydroxystearic acid to provide a soluble polymer chain with a terminal carboxylic acid. This is then reacted with glycidyl methacrylate to form a linear macromonomer. The preparation of the comb type graft dispersant is disclosed in U.S. Pat. No. 3,607,821 which is incorporated herein by reference.

It should be understood that in some instances it may be desirable for some of the reactant species to be added after particulation of the remaining reactants and the nonaqueous medium. These reactants can be added either before or during the polymerization.

The particulated mixture is then subjected to conditions sufficient to induce polymerization of the polymerizable mixture within the microparticles. The particular conditions will vary depending upon the actual materials being polymerized. Generally heat and the addition of an acid catalyst such as para-toluene sulfonic acid or dodecylbenzene sulfonic acid is necessary. The temperature can vary from about 50° C. to about 120° C., preferably 70° C. to 90° C. The length of time required to complete polymerization typically varies from about three hours to about 12 hours.

The progress of the polymerization reaction can be followed by techniques conventionally known to those skilled in the art of polymer chemistry. For example, one can monitor the amount of distillate being removed as the reaction progresses. Typically water and alcohol and occasionally formaldehyde are removed by distillation.

Once the polymerization is complete, the resultant product is a stable dispersion of polymer microparticles in a nonaqueous medium, wherein the polymer is contained within each particle. The nonaqueous medium therefore is substantially free of dissolved polymer since it is essentially self-contained within each microparticle. The resultant polymer microparticles are of course insoluble in the nonaqueous medium. In saying that the nonaqueous medium is substantially free of dissolved polymer, it is intended that the term "substantially free" means that the nonaqueous medium contains no more than 30 percent by weight of dissolved polymer, preferably no more than 15 percent.

By stably dispersed is meant that the polymer microparticles do not settle upon standing and do not coagulate or flocculate on standing. Typically, when diluted to 50 percent total solids the claimed dispersions do not settle even when aged for one month at room temperature As was stated above, a very important aspect of the polymer microparticle dispersions of the claimed invention is that the particle size is uniformly small, i.e., after polymerization less than 20 percent of the polymer microparticles have a mean diameter which is greater than 5 microns, more preferably greater than 1 micron. Preferably the mean diameter of the particles after polymerization ranges from about 0.05 microns to about 0.5 microns. The particle size can be measured with a particle analyzer such as the Coulter N4 instrument commercially available from Coulter. The instrument comes with detailed instructions for making the particle size measurements. However, briefly, a sample of the nonaqueous dispersion is diluted with heptane until the sample concentration falls within the specified limits required by the instrument. The measurement time is 10 minutes. Moreover, generally the microparticle dispersions are characterized by the property that in the absence of a polar solvent, when at a solids content of 60 percent, the Brookfield viscosity is less than 1000 centipoise measured at 50 RPM using a number 3 spindle at 25° C.

It should be understood that the claimed nonaqueous microparticle dispersions can be thixotropic. That is; their viscosity can increase if allowed to stand undisturbed. However, upon application of sufficient high shear for a period of time the viscosity will be decreased.

The claimed microparticle dispersions are high solids materials of low viscosity. Dispersions can be prepared directly with a total solids content of from about 45 percent to about 60 percent. They can also be prepared at a lower solids level of about 30 to about 40 percent total solids and concentrated to a higher level of solids of about 55 to about 75 percent by stripping. This can even be done during the polymerization. The molecular weight and viscosity of the claimed nonaqueous dispersions are independent of each other. The weight average molecular weight of the polymer within the particle can range from a few hundred to infinite molecular weight in the instance of crosslinked microparticles. The Brookfield viscosity can also vary widely from about one poise to about 100 poise, preferably from about 1 to about 5 poise when measured at 25° C. using a number 3 spindle at 50 RPM.

The microparticle dispersions can be either crosslinked or uncrosslinked. For uncrosslinked microparticles the polymer can be either linear or branched.

As is well appreciated by those skilled in the art of polymer chemistry, the degree of branching and/or crosslinking is dependent on the functionality of the reactants and the degree of polymerization.

The microparticle dispersions of the claimed invention are further characterized in that the polymer is prepared from reactants which are substantially free of acrylic polymer. By "substantially free of acrylic polymer" is meant that the reactants contain no more than about 30 percent by weight of acrylic polymer, preferably no more than about 20 percent by weight and more preferably no more than about 10 percent by weight based on the total weight of the reactants of the polymer. Those skilled in the art of polymer chemistry readily appreciate the meaning of the expression "acrylic polymer", therefore no additional explanation is felt to be necessary.

The nonaqueous dispersions of the present invention are very advantageous. They can be used in a variety of protective and decorative coatings including coatings, adhesives, sealants, molding resins, casting resins and free films. As has been mentioned above, they are high solids materials but of a low viscosity. The fact that they are high solids materials is particularly advantageous. Since the claimed dispersions are of high solids they can be utilized in coating applications without significantly increasing the volatile organic content of the composition.

The following examples are illustrative of the invention and are not intended to be limiting.

EXAMPLE I

This example illustrates the preparation of a polyester melamine crosslinked microparticle dispersion.

A solution was prepared by mixing the following ingredients:

| Ingredients | Parts by Weight (grams) |
| --- | --- |
| CYMEL 303[1] | 510 |
| polyester polyol[2] | 1530 |
| dispersant[3] | 578 |
| dodecylbenzene sulfonic acid (70 percent solution) | 28.9 |
| acetonitrile | 595 |

[1]This is hexamethoxymethylmelamine, commercially available by American Cyanamid.
[2]This polyester polyol was prepared from 27.7 percent of neopentyl glycol, 40.9 percent of hexahydrophthalic anhydride and 31.4 percent of 1,6-hexanediol. It had a number average molecular weight of 360 and a hydroxyl number of 180.
[3]This dispersant is a comb type stabilizer and is prepared as set out below:
The preparation of the comb type stabilizer is done in two steps.
Step A: Synthesis of poly(12-hydroxystearyl) methacrylate:
A five liter round bottom flask was charged with 444.5 g of toluene and 100 g of 12-hydroxystearic acid. The solution was heated at 85° C. while 2420 g of solid 12-hydroxystearic acid was added slowly enough to allow the mixture to be stirred as the solid melted and dissolved. After a homogeneous solution was obtained, 5.04 g of methanesulfonic acid was added and the mixture was heated to reflux (136° C. to 147° C.) while the water produced during the reaction was collected in a Dean Stark trap. When the acid value reached 30 the mixture was allowed to cool to 125° C.. After first adding 2.52 g of IONOL (2,6-ditertiarybutyl para-cresol from Shell Chemical Company) dissolved in 2.52 g of toluene and 112.5 g of VM + P naphtha, 304.5 g of glycidyl methacrylate and 10.1 g of dimethylcocoamine were added. The resulting solution was then heated at reflux (149° C.) until the acid value dropped to 0.1.
Step B: Compolymerization of poly(12-hydroxystearyl) methacrylate with acrylic monomers: A five liter round bottom flask charged with 421 g of toluene was heated at reflux while the following two solutions were added simultaneously over a three hour period.
Monomer
958 g poly(12-hydroxystearyl) methacrylate of Part A
720 g methyl methacrylate
64 g glycidyl methacrylate
16 g methacrylic acid
721 g VM + P naphtha
Initiator
28 g 2,2'-azobis(2-methylbutanenitrile), VAZO-67 from E. I. DuPont deNemours.
250 g toluene.
When the additions were complete, 3.2 g of VAZO-67 dissolved in 50 g of toluene was added over a one hour period. The solution was held reflux for one more hour before cooling.

The above mixture was added to 1,496 grams of ISOPAR K (boiling range 177° C. to 197° C., commercially available from Exxon) and 2,550 grams of heptane (boiling range 94° C. to 98° C.). The total mixture was stirred vigorously to produce a mixture which was passed through a MICROFLUIDIZER ® M 110 emulsifier at a pressure of 7,900 psi to produce an opaque, bluish-white emulsion. The emulsion was stirred at 75° C. to 100° C. for 10 hours under a stream of nitrogen while collecting distillate. Vacuum was applied for six hours at 85° C to remove solvent and achieve a final total solids content of 63 percent.

EXAMPLE II

This Example illustrates the preparation of a glycoluril-polyol nonaqueous microparticle dispersion.

A solution was prepared by stirring together the following ingredients:

| Ingredients | Parts by Weight (grams) |
| --- | --- |
| CYMEL 1171[4] | 1500 |
| ethylene glycol | 375 |
| dodecylbenzene sulfonic acid (70 percent) | 53.8 |
| dispersant of footnote (3) | 531.3 |

[4]This is an ethylated, methylated, tetramethylol glycoluril commercially available from American Cyanamid.

The solution was added to a stirring mixture of Isopar K (aliphatic solvent from Exxon having boiling point range of 177° C. to 197° C.) and 3750g heptane (boiling point range of 94° C. to 98° C.). The resulting mixture was passed through a MICROFLUIDIZER ® M 110 emulsifier to produce a stable, bluish-white emulsion which was then heated at 70° C. to 80° C. for five hours under a nitrogen sparge. Of 1387 ml of distillate collected, 481 ml separated into a lower layer. The emulsion was further condensed by vacuum distillation at 50° C to a total solids content of 51.8 percent. The Brookfield viscosity of the final emulsion was 124 centipoise at 50 rpm using a number 3 spindle. The dispersion exhibited an increase in viscosity upon standing undisturbed for several days however upon application of high shear the viscosity decreased.

EXAMPLE III

This Example illustrates the preparation of a benzoguanamine polyol nonaqueous microparticle dispersion.

A solution was prepared by mixing the following ingredients:

| Ingredients | Parts by Weight (grams) |
| --- | --- |
| CYMEL 1123[5] | 70 |
| polyurethane polyol[6] | 350 |
| dodecylbenzene sulfonic acid (70 percent solution) | 10 |
| dispersant of footnote 3 | 96 |
| acetonitrile | 40 |

[5]This is a methylated, ethylated benzoguanamine formaldehyde condensate commercially available from American Cyanamid.
[6]This polyurethane polyol was prepared from 23.6 percent 1,6-hexanediol, 30.8 percent hexahydrophthalic anhydride, 20.8 percent neopentyl glycol and 24.7 percent trimethyl hexamethylene diisocyanate. The polyol which was prepared as an 80 percent solution in methyl isobutyl ketone had a hydroxyl equivalent weight of 695.

The above solution was added while stirring to 250g of ISOPAR G (aliphatic solvent with a boiling range of 156° C. to 176° C., available from Exxon) and 500g heptane (boiling range of 94° C. to 98° C.) and then passed through a MICROFLUIDIZER ® M 110 emulsifier at 9900 psi. The resulting emulsion was then heated at 60° C. for three hours and at 80° C. for an additional three hours under a nitrogen sparge that removed the alcohols being liberated. The emulsion was vacuum stripped to a final total solids content of 62.5 percent. The Brookfield viscosity at 50 rpm using a number 3 spindle was 138 centipoise. The mean particle size, as measured on a Coulter N4 particle size analyzer was 341 nanometers (0.341 micron) with a standard deviation of 88 nanometers (0.088 micron).

EXAMPLE IV

This example illustrates the preparation of a nonaqueous microparticle dispersion of the self-condensation polymeric product of a urea-formaldehyde condensate.

A solution of the following ingredients was prepared:

| Ingredients | Parts by Weight (grams) |
| --- | --- |
| BEETLE 65[7] | 450 |
| dispersant of footnote (3) | 125 |
| acetonitrile | 50 |
| water | 100 |
| dodecylbenzene sulfonic acid | 14.3 |

[7] This is a methylated urea-formaldehyde condensate commerically available from American Cyanamid.

The above solution was added while stirring to 350g ISOPAR G (aliphatic solvent with a boiling range of 156° C. to 176° C., available from Exxon) and 700g heptane (boiling range 94° C. to 98° C.) and then passed through a MICROFLUIDIZER ® M-110 emulsifier at 8100 psi. The resulting emulsion was heated at 80° C. to 90° C. for 9 hours under a stream of nitrogen. The total amount of distillate collected was 450 ml with 104 ml in the bottom layer. The final total solids content was 48.9 percent and the Brookfield viscosity using a number 1 spindle at 50 rpm was 22.4 centipoise. The mean particle size, as measured on a Coulter N4 particle size analyzer, was 331 nanometers (0.331 micron) with a standard deviation of 86 nanometers (0.086 micron).

What is claimed is:

1. A stable nonaqueous microparticle dispersion of the self condensation polymeric product reactants comprising an aminoplast resin which is characterized in that less than 20 percent of the polymer microparticles have a mean diameter greater than five microns, further characterized in that at a total solids content of 60 percent the Brookfield viscosity is less than 1000 centipoise measured at 50 RPM using a number 3 spindle at 25° C., the polymeric product being prepared from reactants which are substantially free of acrylic polymer in a nonaqueous medium which is inert to the reactants.

2. A stable nonaqueous microparticle dispersion of the polymeric reaction product of reactants comprising an aminoplast resin and a hydroxyl containing material is characterized in that less than 20 percent of the polymer microparticles have a mean diameter greater than five microns, further characterized in that at a total solids content of 60 percent the Brookfield viscosity is less than 1000 centipoise measured at 50 RPM using a number 3 spindle at 25° C., the polymeric reaction product being prepared from reactants which are substantially free of acrylic polymer in a nonaqueous medium which is inert to the reactants.

3. The microparticle dispersion of claim 2 wherein less than 20 percent of the polymer microparticles have a mean diameter greater than 1 micron.

4. The microparticle dispersion of claim 2 wherein the mean diameter of the polymer microparticles ranges from about 0.05 micron to 0.5 micron.

5. The dispersion of claim 2 wherein the polymeric reaction product is contained within each microparticle and the nonaqueous medium is substantially free of dissolved polymer.

6. The dispersion of claim 5 wherein the nonaqueous medium contains no more than 30 percent of dissolved polymer.

7. The dispersion of claim 6 wherein the nonaqueous medium contains no more than 15 percent of dissolved polymer.

8. The dispersion of claim 2 wherein the hydroxyl containing material is a polyol.

9. The dispersion of claim 8 wherein the polyol is selected from the group of polyester polyols, polyether polyols, and polyurethane polyols.

10. The dispersion of claim 2 wherein the polymer microparticles are crosslinked.

11. The dispersion of claim 2 wherein the polymer microparticles are uncrosslinked.

12. The dispersion of claim 1 wherein the reactants contain no more than about 30 percent by weight of acrylic polymer based on the total weight of the reactants of the polymer.

13. dispersion of claim 12 wherein the reactants contain no more than about 20 percent by weight of acrylic polymer.

14. The dispersion of claim 13 wherein the reactants contain no more than about 10 percent by weight of acrylic polymer.

* * * * *

UNITED STATES PATENT AND TRADEMARK OFFICE
CERTIFICATE OF CORRECTION

PATENT NO. : 5,084,506

DATED : January 28, 1992

INVENTOR(S) : Dennis L. Faler. et al.

It is certified that error appears in the above-identified patent and that said Letters Patent is hereby corrected as shown below:

In the Claims, column 11, line 38, --of-- should be inserted after "product".

column 12, line 42, --The-- should be inserted before "dispersion".

Signed and Sealed this

Twenty-first Day of December, 1993

Attest:

BRUCE LEHMAN

Attesting Officer

Commissioner of Patents and Trademarks